B. W. BEAN.
Sewing Machine.
No. 131.
Reissued March 10, 1849.
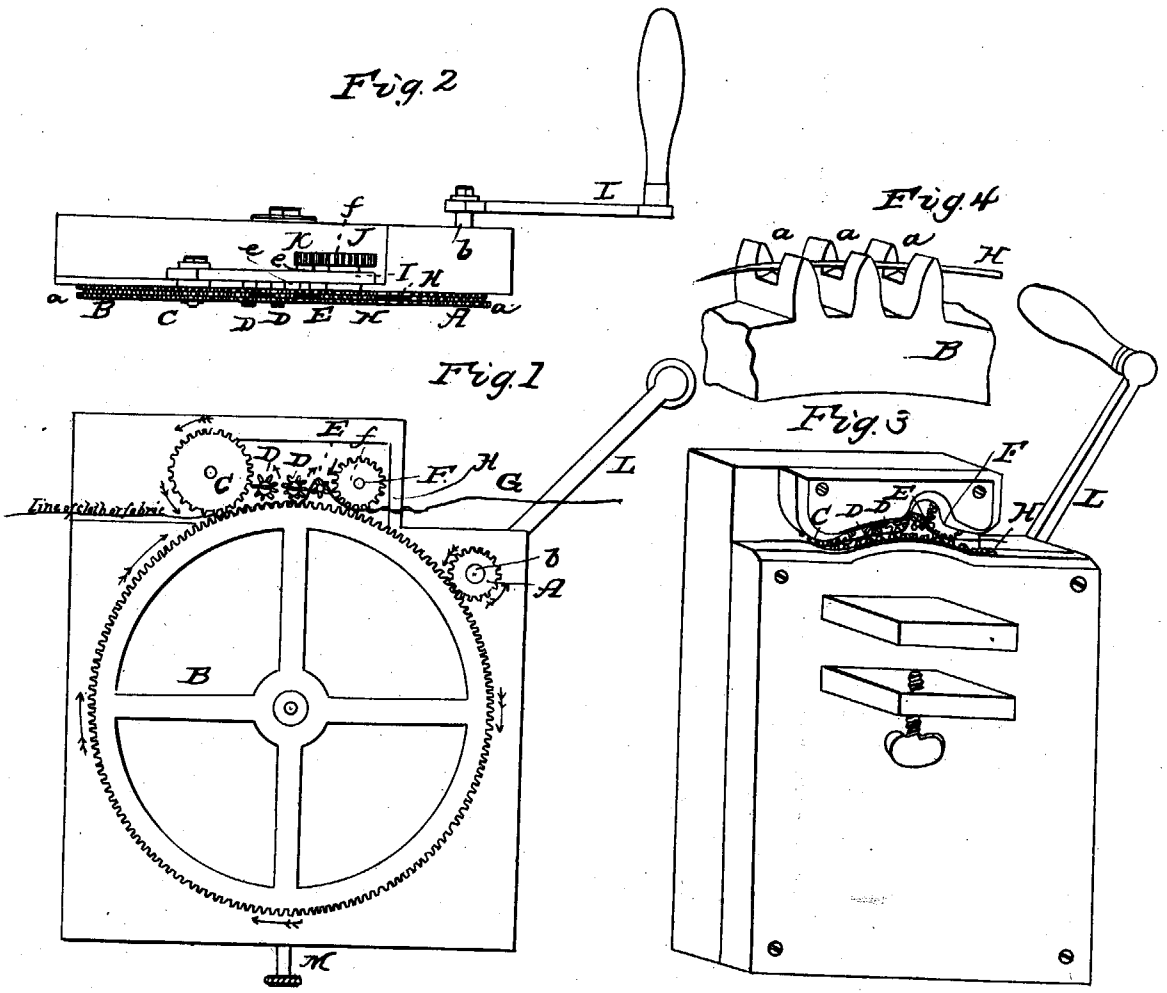
N. PETERS, Photo-Lithographer, Washington, D. C.

UNITED STATES PATENT OFFICE.

BENJ. W. BEAN, OF NEW YORK, N. Y.

MACHINE FOR SEWING CLOTH OF ALL KINDS WITH A RUNNING STITCH.

Specification forming part of Letters Patent No. 2,982, dated March 1, 18 3; Reissue No. 131, dated March 10, 1849.

*To all whom it may concern:*

Be it known that I, BENJAMIN W. BEAN, of the city, county, and State of New York, have invented a Machine for Sewing Cloth; and I do hereby declare that the same is fully described and represented in the following specification and accompanying drawings, letters, figures, and references thereof.

My invention consists of a combination of gear-wheels and a needle so applied together and arranged with respect to each other that the gear-wheels, when they are revolved and cloth is passed between them, shall make or form what I term the "doubles," or the bends, corrugations, or foldings, of the edges of the cloth necessary for the passage of the needle through it, in order to the performance of the sewing of the running stitch.

Figure 1 of the aforementioned drawings is a side elevation of my machine. Fig. 2 is a top view. Fig. 3 is a perspective elevation of the wooden coverings, facings, or framework which give support to the operative parts, some of which are also indicated or shown. Fig. 4 denotes a perspective view of a portion of the main gear, or that lettered B in the other drawings, the said figure also representing a portion of the needle H as it lies in the spaces, recesses, grooves, or channels of the teeth of the wheel. The waving or undulating red lines seen in Fig. 1 exhibit the cloth in its passage between the gear-wheels and upon the needle.

In Figs. 1, 2, and 3 B and C are the two gear-wheels by which the doubles or corrugations of the cloth are produced. Each tooth of each of said wheels is provided with a space or recess, *a*, for the reception of the needle H, the said recess and the needle being seen on an enlarged scale in Fig. 4. The needle, which in some instances may be made straight and in others curved, is seen at H as extending between the wheels B and C, and so arranged as to enable the doubles or corrugations to be successively forced against its point, and in such manner as to cause the needle to pass through them. The needle has an eye at its opposite end for the reception of the thread G, the cloth as fast as it is run on the needle and upon the thread.

The mechanism which produces the movements of the cloth along and off the needle consists of one or more small cogged wheels, D D F, made and applied to the wheels B and C, essentially as represented in the drawings, they (the said wheels D D F, or either of them) having such number of teeth as either circumstances or fancy may require. The teeth of said wheels work successively between the doublings or corrugations of the cloth, and crowd them along on the needle in a direction toward its eye. The directions in which the said wheels are made to revolve with respect to each other are exhibited in Fig. 1 by arrows. The revolutions of the wheel B are produced by a pinion, A, which is situated on an arbor, *b*, on which is a crank, L, which, being turned, puts the shaft and pinion in rotation.

In order to enable the needle to maintain its correct position during the formation of the corrugations, I crook or bend it between the wheels D and F, as seen at *c*, and within the crook or bend I usually place a small cogged wheel, E, for the purpose of insuring the passage of the corrugations over or along the crook or bend of the needle. The said wheel E also serves in a measure to sustain the needle in place. The crook of the needle prevents its retrogradation during the operation of making the doubles of the cloth and crowding them over the needle. The pinion E is supported on a short shaft, *e*, which extends through and is sustained by the bearing-plate I. On the rear end of the shaft *e* is a pinion, K, which works into or engages with a gear-wheel, J, fixed on the arbor *f* of the wheel F. The recess made in each tooth of the several gear-wheels admits of the proper engagement or working by them of their teeth while the needle is between them. The wheel B may be provided with suitable contrivances by which its distance from the wheels C, D, and F may be adjusted, so to enable the machine to operate on cloth of any ordinary thickness. For this purpose I usually make use of a screw, M, to operate against sliding bearings for the journals of the wheel B, or directly against one or both of the journals of the said wheel, as circumstances may require. If necessary, the pinion C may also have proper adjustable contrivances applied to it, by which its position may be regulated or varied. I do not confine my invention to any particular kind or kinds of such contrivances, as any well known or in common use and which will answer the purpose may be employed.

The process of sewing by the above-described machine consists in passing the cloth between the wheels B and C while they are in revolution. They grasp it, and by means of their teeth give to it a serpentine or corrugated form and move it against and upon the needle. The other wheels next perform their office or offices as above specified, the cloth being finally drawn off the needle and upon the thread passed through the eye thereof.

What I claim as my invention is—

1. The combination of a straight or curved needle and two or more gear-wheels for forming the doubles or corrugations of the cloth, the whole being made to operate together essentially as above specified, and in combination therewith I claim one or more cogged wheels, D D F, applied substantially as above specified, and for the purpose of advancing the doubles of the cloth along the needle, as above explained.

2. The hereinbefore-described mode of preventing either retrogradation or any improper movement of the needle—viz., by making it with a crook or bend and placing against said bend one, two, or more wheels, D E F, as hereinbefore described, and as represented in the drawings.

In testimony whereof I have hereto set my signature this 18th day of January, A. D. 1849.

BENJAMIN W. BEAN.

Witnesses:

EDWD. JENKINS,

JASPER STUNZ.